United States Patent
Ogawa et al.

(10) Patent No.: US 8,569,404 B2
(45) Date of Patent: Oct. 29, 2013

(54) POLYAMIDE RESIN COMPOSITION AND MOLDED ARTICLE

(75) Inventors: Shun Ogawa, Kanagawa (JP); Takahiko Sumino, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 152 days.

(21) Appl. No.: 13/322,499

(22) PCT Filed: May 28, 2010

(86) PCT No.: PCT/JP2010/059138
§ 371 (c)(1),
(2), (4) Date: Nov. 25, 2011

(87) PCT Pub. No.: WO2010/137704
PCT Pub. Date: Dec. 2, 2010

(65) Prior Publication Data
US 2012/0065303 A1    Mar. 15, 2012

(30) Foreign Application Priority Data

May 28, 2009 (JP) ................................. 2009-129218

(51) Int. Cl.
*C08K 5/00* (2006.01)
*C08K 5/34* (2006.01)

(52) U.S. Cl.
USPC ........................................................... 524/93

(58) Field of Classification Search
USPC ........................................................... 524/93
See application file for complete search history.

(56) References Cited

U.S. PATENT DOCUMENTS

| 6,319,986 B1 | 11/2001 | Amimoto et al. |
| 2011/0224370 A1 | 9/2011 | Kanda et al. |
| 2011/0245454 A1 | 10/2011 | Kuwahara et al. |

FOREIGN PATENT DOCUMENTS

| FR | 1306168 A | 10/1962 |
| JP | 59 027948 | 2/1984 |
| JP | 10 158461 | 6/1998 |
| JP | 2000 080270 | 3/2000 |
| JP | 2001 329169 | 11/2001 |
| JP | 2003 026797 | 1/2003 |
| JP | 2007 039577 | 2/2007 |
| JP | 2008 275155 | 11/2008 |

OTHER PUBLICATIONS

International Search Report Issued Aug. 24, 2010 in PCT/JP10/059138 Filed May 28, 2010.
Extended European Search Report issued Oct. 18, 2012 in Patent Application No. 10780658.0.
U.S. Appl. No. 13/395,535, filed Mar. 12, 2012, Ogawa, et al.
U.S. Appl. No. 13/322,519, filed Nov. 25, 2011, Ogawa, et al.

*Primary Examiner* — Terressa Boykin
(74) *Attorney, Agent, or Firm* — Oblon, Spivak, McClelland, Maier & Neustadt, L.L.P.

(57) ABSTRACT

Disclose is a polyamide resin composition having excellent heat resistance, heat aging resistance and mechanical physical properties, which is produced by incorporating a specified aromatic secondary amine compound and a specified organic sulfur based compound into a polyamide composed of a diamine unit containing a paraxylylenediamine unit as a major component and a dicarboxylic acid unit containing a linear aliphatic dicarboxylic acid unit having from 6 to 18 carbon atoms as a major component.

20 Claims, No Drawings

POLYAMIDE RESIN COMPOSITION AND MOLDED ARTICLE

TECHNICAL FIELD

The present invention relates to a polyamide resin composition and to a molded article comprising the same. In detail, the present invention relates to a polyamide resin composition comprising specified polyamide raw material, amine compound and organic sulfur based compound and having excellent molding processability, heat resistance, heat aging resistance, low water absorption properties, chemical resistance and mechanical physical properties and to a molded article. The polyamide resin composition of the present invention is used as industrial, commercial or household goods such as automobile parts, electric and electronic parts, mechanical parts, and the like, and in particular, can be suitably used for various parts which are used under a high temperature condition, such as parts of automobile engine rooms and the like.

BACKGROUND ART

Aliphatic polyamides represented by nylon 6 and nylon 66 have been used as an engineering plastic for many applications because they have excellent properties such as heat resistance, chemical resistance, rigidity, abrasion resistance, moldability, and the like. The majority of them are used in the field where heat resistance is required. In particular, in the case of being exposed to a high temperature over a long period of time as in automobile parts or the like, heat deterioration or oxidative deterioration of resin is of a serious problem. Though the foregoing aliphatic polyamides have a high melting point, when exposed to a high temperature of 100° C. or higher in air, they become conspicuously brittle within a short period of time. Then, in the case of being used in an application field where such long-term heat stability (hereinafter sometimes referred to as "heat aging resistance") is required, a formulation for preventing the oxidative deterioration at a high temperature from occurring is made by various methods.

Recently, a semi-aromatic polyamide composed mainly of a polyamide obtained by polycondensation of 1,6-hexanediamine and terephthalic acid, which has a higher melting point than the conventional polyamides and which is called "6T based polyamide", has also been started to be used as a new engineering plastic.

For example, Patent Document 1 proposes a method of ensuring the heat aging resistance regarding the 6T based polyamide. However, since the polyamide obtained by polycondensation of terephthalic acid and 1,6-hexanediamine has a melting point in the neighborhood of 370° C. exceeding decomposition temperatures of polymers, it is difficult to achieve melt polymerization or melt molding so that it cannot endure practical use. For that reason, in fact, it is the present situation that such a polyamide is used as a composition whose melting point has been decreased to a practically useful temperature range, namely to about 280 to 320° C., by copolymerizing with from 30 to 40% by mole of a dicarboxylic acid component such as adipic acid, isophthalic acid, and the like, or an aliphatic polyamide such as nylon 6 and the like. In this way, the copolymerization of a large amount of the third component (also, a fourth component according to circumstances) is certainly effective for decreasing the melting point of polymer. Meanwhile, however, lowering of crystallization rate or ultimate degree of crystallization is brought, and as a result, not only various physical properties such as rigidity at a high temperature, chemical resistance, dimensional stability, and the like are deteriorated, but lowering of productivity following prolongation of molding cycling is brought, too. Also, as compared with the conventional aliphatic polyamides, the dimensional stability by water absorption is improved slightly, but it does not reach a level on which the problem is substantially solved. Also, lowering of toughness and an increase of coefficient of water absorption of polyamide resin compositions to be caused due to blending of a copper compound for the purpose of ensuring the heat aging resistance were problematic.

As other high-melting polyamides than the 6T based polyamide, there is a semi-aromatic polyamide obtained by polycondensation of a mixture of 1,9-nonanediamine and 2-methyl-1,8-octanediamine and terephthalic acid, which is called "9T based polyamide". With respect to the 9T based polyamide, for example, Patent Document 2 proposes a method of ensuring long-term heat stability by the addition of a copper compound and a crystal nucleating agent. However, in these compositions, though crystallinity, heat resistance, dimensional stability following water absorption, and the like are improved, there was involved such a problem that an application range is limited because of low rigidity. Also, with respect to the 9T based polyamide, the problems of lowering of toughness and an increase of coefficient of water absorption of polyamide resin compositions to be caused due to blending of the copper compound were not solved yet.

Also, as a method of improving the heat aging resistance by blending a stabilizer other than the copper compound, for example, Patent Document 3 proposes a polyamide resin composition obtained by blending a hindered phenol compound, a phosphorus based stabilizer, and a sulfur based stabilizer; and for example, Patent Documents 4 and 5 propose a polyamide resin composition obtained by blending an amine based antioxidant and a phenol based antioxidant. However, there are not described especially preferred combinations of compounds.

Patent Document 1: JP-A-63-105057
Patent Document 2: JP-A-7-228768
Patent Document 3: JP-A-6-136263
Patent Document 4: JP-A-5-5060
Patent Document 5: JP-A-2006-28327

DISCLOSURE OF THE INVENTION

Problems to be Solved by the Invention

An object of the present invention is to solve the foregoing problems and to provide a polyamide resin composition having excellent heat resistance, heat aging resistance and mechanical physical properties and a molded article comprising the same.

Means for Solving the Problems

The present inventors made extensive and intensive investigations. As a result, it has been found that a polyamide resin composition comprising a polyamide composed of a diamine unit composed mainly of a paraxylylenediamine unit and a dicarboxylic acid unit composed mainly of a linear aliphatic dicarboxylic acid unit having from 6 to 18 carbon atoms, a specified aromatic secondary amine compound, and a specified organic sulfur based compound is excellent in various physical properties such as heat resistance, heat aging resistance, chemical resistance, mechanical physical properties, dimensional stability, and the like.

That is, the present invention is concerned with a polyamide resin composition comprising (A) a polyamide composed of a diamine unit containing 70% by mole or more of a paraxylylenediamine unit and a dicarboxylic acid unit containing 70% by mole or more of a linear aliphatic dicarboxylic acid unit having from 6 to 18 carbon atoms; (B) an aromatic secondary amine compound; and (C) an organic sulfur based compound, the polyamide resin composition containing from 0.05 to 5 parts by mass of the aromatic secondary amine compound (B) and from 0.05 to 5 parts by mass of the organic sulfur based compound (C) based on 100 parts by mass of the polyamide (A).

Also, the present invention is concerned with a molded article comprising the subject polyamide resin composition.

Effects of the Invention

The polyamide resin composition of the present invention can be suitably used for small-sized and thin-walled molded articles requiring high crystallization rate, high ultimate degree of crystallization, or low water absorption properties, headlight reflectors of automobiles requiring heat resistance performance or rigidity, and various parts which are used under a high temperature condition, such as parts of engine rooms and the like. Also, the polyamide resin composition of the present invention can be subjected to molding processing into a form of film, sheet, tube or fiber and can be suitably used for commercial goods and household goods.

MODES FOR CARRYING OUT THE INVENTION

<Polyamide Resin Composition>

The polyamide resin composition of the present invention contains (A) a polyamide composed of a diamine unit and a dicarboxylic acid unit, (B) an aromatic secondary amine compound, and (C) an organic sulfur based compound, each of which is described later. Incidentally, in the present invention, the "diamine unit" refers to a constituent unit derived from a raw material diamine component of the polyamide, and the "dicarboxylic acid unit" refers to a constituent unit derived from a raw material dicarboxylic acid of the polyamide.

The raw material diamine component which is used for the polyamide (A) is one containing 70% by mole or more, more preferably 80% by mole or more, and especially preferably 90% by mole or more of paraxylylenediamine. When the diamine component contains 70% by mole or more of paraxylylenediamine, the resulting polyamide can be suitably used for various applications as the polyamide resin composition which exhibits high melting point and high crystallinity and which is excellent in heat resistance, chemical resistance, and the like. The case where the concentration of paraxylylenediamine in the raw material diamine component is less than 70% by mole is not preferable because the heat resistance and the chemical resistance are lowered.

As the raw material diamine component other than paraxylylenediamine, there can be exemplified aliphatic diamines such as 1,4-butanediamine, 1,6-hexanediamine, 1,8-octanediamine, 1,10-decanediamine, 1,12-dodecanediamine, 2-methyl-1,5-pentanediamine, 2,2,4-trimethyl-1,6-hexanediamine, 2,4,4-trimethyl-1,6-hexanediamine, 2-methyl-1,8-octanediamine, 5-methyl-1,9-nonanediamine, and the like; alicyclic diamines such as 1,3-bis(aminomethyl)cyclohexane, 1,4-bis(aminomethyl)cyclohexane, cyclohexanediamine, methylcyclohexanediamine, isophoronediamine, and the like; aromatic aliphatic diamines such as metaxylylenediamine and the like; or mixtures thereof. However, it should not be construed that the present invention is limited thereto.

The raw material dicarboxylic acid component which is used for the polyamide (A) is one containing 70% by mole or more, more preferably 80% by mole or more, and especially preferably 90% by mole or more of a linear aliphatic dicarboxylic acid having from 6 to 18 carbon atoms. When the dicarboxylic acid component contains 70% by mole or more of a linear aliphatic dicarboxylic acid having from 6 to 18 carbon atoms, the resulting polyamide can be suitably used for various applications as the polyamide resin composition which exhibits fluidity at the time of melt processing, high crystallinity and low coefficient of water absorption and which is excellent in heat resistance, chemical resistance, molding processability, and dimensional stability. The case where the concentration of the linear aliphatic dicarboxylic acid having from 6 to 18 carbon atoms in the raw material dicarboxylic acid component is less than 70% by mole is not preferable because the heat resistance, the chemical resistance, and the molding processability are lowered.

As the linear aliphatic dicarboxylic acid having from 6 to 18 carbon atoms, there can be exemplified adipic acid, pimelic acid, suberic acid, azelaic acid, sebacic acid, undecane diacid, dodecane diacid, tridecane diacid, tetradecane diacid, pentadecane diacid, hexadecane diacid, and so on. Above all, azelaic acid, sebacic acid, undecane diacid, and dodecane diacid are preferable, and sebacic acid and azelaic acid are especially preferable. In the case of using the linear aliphatic dicarboxylic acid having from 6 to 18 carbon atoms, collapse of a reaction molar ratio between the diamine and the dicarboxylic acid or lowering of melting point to be caused due to distillation of the dicarboxylic acid out the reaction system at the time of polycondensation reaction can be prevented from occurring, and lowering of mechanical physical properties, heat stability or heat resistance of the resulting polyamide can be suppressed.

As the raw material dicarboxylic acid other than the linear aliphatic dicarboxylic acid having from 6 to 18 carbon atoms, there can be exemplified malonic acid, succinic acid, 2-methyladipic acid, trimethyladipic acid, 2,2-dimethylglutaric acid, 2,4-dimethylglutaric acid, 3,3-dimethylglutaric acid, 3,3-diethylsuccinic acid, 1,3-cyclopentanedicarboxylic acid, 1,3-cyclohexanedicarboxylic acid, 1,4-cyclohexanedicarboxylic acid, isophthalic acid, terephthalic acid, 2,6-naphthalenedicarboxylic acid, 1,5-naphthalenedicarboxylic acid, 1,4-naphthalenedicarboxylic acid, and 2,7-naphthalenedicarboxylic acid; or mixtures thereof. However, it should not be construed that the present invention is limited thereto.

Besides the foregoing diamine component and dicarboxylic acid component, lactams such as ε-caprolactam, laurolactam, and the like; and aliphatic aminocarboxylic acids such as aminocaproic acid, aminoundecanoic acid, and the like can also be used as the copolymerization component of the polyamide (A) within the range where the effects of the present invention are not hindered.

At the time of polycondensation of the polyamide (A) in the present invention, a small amount of a monofunctional compound having reactivity with a terminal amino group or carboxyl group of the polyamide may be added as a molecular weight modifier. As the compound which can be used, there can be exemplified aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, and the like; aromatic monocarboxylic acids such as benzoic acid, toluic acid, naphthalenecarboxylic acid, and the like; aliphatic monoamines such as butylamine, amylamine, isoamylamine, hexylamine, heptylamine, octylamine, and the like; aromatic aliphatic monoamines such as benzylamine, methylbenzylamine, and the like; or mixtures thereof. However, it should not be construed that the present invention is limited thereto.

In the case of using the molecular weight modifier at the time of polycondensation of the polyamide (A) in the present invention, though its suitable use amount varies depending upon the reactivity or boiling point of the molecular weight modifier to be used, a reaction condition, or the like, it is usually from about 0.1 to 10% by mass relative to the raw material diamine and dicarboxylic acid.

The polyamide (A) in the present invention can be obtained by a known polyamide synthesis method such as (a) polycondensation in a molten state; (b) so-called solid phase polymerization in which polycondensation in a molten state is carried out to obtain a polyamide having a low molecular weight, which is then heat treated in a solid phase state; (c) extrusion polymerization in which polycondensation in a molten state is carried out to obtain a polyamide having a low molecular weight, which is then made to have a high molecular weight in a molten state by using a kneading extruder; and the like.

Though the polycondensation method in a molten state is not particularly limited, there can be exemplified a method in which an aqueous solution of a nylon salt made of the diamine component and the dicarboxylic acid component is heated under pressure, and the polycondensation is carried out in a molten state while removing water and condensed water; and a method in which the diamine component is directly added to the dicarboxylic acid in a molten state, and the polycondensation is carried out under atmospheric pressure or in a water-vapor pressurized atmosphere. In the case of adding the diamine directly to the dicarboxylic acid in a molten state and carrying out the polymerization, the polycondensation is advanced while continuously adding the diamine component to the molten dicarboxylic acid phase for the purpose of keeping the reaction system in a uniform liquid state and controlling the reaction temperature such that it is not lower than the melting points of the formed oligoamide and polyamide.

The polyamide obtained by melt polycondensation is once taken out, pelletized and then dried for use. Also, for the purpose of more increasing the degree of polymerization, solid phase polymerization may be carried out. As a heating apparatus which is used for drying or solid phase polymerization, a continuous heat drying apparatus, a rotary drum type heating apparatus called, for example, a tumble dryer, a conical dryer, a rotary dryer, etc., or a cone type heating apparatus equipped with a rotary blade in the inside thereof, called a Nature mixer, can be suitably used. However, known methods and apparatuses can be used without being limited thereto. In particular, in the case of carrying out solid phase polymerization of the polyamide, among the foregoing apparatuses, a batch type heating apparatus is preferably used in view of the facts that the inside of the system can be hermetically sealed; and that the polycondensation is easily advanced in a state where oxygen which causes coloration is removed.

In the polycondensation system of the polyamide (A) in the present invention, a phosphorus atom-containing compound may be added as an antioxidant for preventing coloration of the polyamide due to the catalyst of the polycondensation reaction and oxygen existing in the polycondensation system. Examples of the phosphorus atom-containing compound to be added include alkaline earth metal salts of hypophosphorous acid, alkali metal salts of phosphoric acid, alkaline earth metal salts of phosphoric acid, alkali metal salts of pyrophosphoric acid, alkaline earth metal salts of pyrophosphoric acid, alkali metal salts of metaphosphoric acid, alkaline earth metal salts of metaphosphoric acid, and so on. Specifically, there can be exemplified calcium hypophosphite, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phosphate, dicalcium hydrogen phosphate, calcium dihydrogen phosphate, lithium phosphate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, and lithium metaphosphate; or mixtures thereof. However, it should not be construed that the present invention is limited thereto.

An addition amount of the phosphorus atom-containing compound which is added in the polycondensation system of the polyamide (A) in the present invention is preferably from 50 to 1,000 ppm, more preferably from 60 to 400 ppm, and especially preferably from 70 to 300 ppm in terms of the phosphorus atom concentration in the polyamide (A). When the phosphorus atom concentration is from 50 to 1,000 ppm, an effect as the antioxidant is sufficiently obtainable, and coloration of the polyamide resin composition can be prevented from occurring. Also, a gelation reaction of the polyamide resin composition is suppressed, and deterioration of the appearance to be caused due to incorporation of a foreign matter into a molded article can be prevented from occurring.

Also, it is preferable to add a polymerization rate modifier in combination with the phosphorus atom-containing compound in the polycondensation system of the polyamide (A) in the present invention. In order to prevent coloration of the polyamide during the polycondensation from occurring, it is necessary to allow a sufficient amount of the phosphorus atom-containing compound to exist. However, there is a concern that gelation of the polyamide is brought, and therefore, for the purpose of adjusting an amidation reaction rate, it is also preferable to make the polymerization rate modifier to coexist. Examples of the polymerization rate modifier include alkali metal hydroxides, alkaline earth metal hydroxides, alkali metal acetates, alkaline earth metal acetates, and so on, with alkali metal hydroxides or alkali metal acetates being preferable. Specifically, as the polymerization rate modifier, there are exemplified lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, and barium acetate; or mixtures thereof. However, it should not be construed that the present invention is limited thereto.

In the case of adding the polymerization rate modifier in the polycondensation system, a molar ratio of the phosphorus atom of the phosphorus atom-containing compound and the polymerization rate modifier (=[amount of substance of the polymerization rate modifier]/[amount of substance of the phosphorus atom of the phosphorus atom-containing compound]) is preferably from 0.1 to 1.0, more preferably from 0.2 to 0.95, and especially preferably from 0.3 to 0.8. When the foregoing molar ratio is from 0.1 to 1.0, an amidation reaction promoting effect of the phosphorus atom-containing compound is moderately suppressed, and the generation of a gel in the polyamide is reduced.

Though there are several indexes for the degree of polymerization of polyamide resin, a relative viscosity is generally employed. The relative viscosity of the polyamide (A) in the present invention is preferably from 1.8 to 4.2, more preferably from 1.9 to 3.5, and especially preferably from 2.0 to 3.0. When the relative viscosity of the polyamide (A) is from 1.8 to 4.2, fluidity of the molten polyamide (A) becomes stable, deterioration of the appearance of a molded article can be prevented from occurring, and molding processing can be made stable. Incidentally, the relative viscosity as referred to herein is a ratio of a drop time (t) as measured at 25° C. with a Cannon-Fenske viscometer after dissolving 1 g of a polyamide in 100 mL of 96% sulfuric acid and a drop time (t0) of 96% sulfuric acid itself as similarly measured and is expressed according to the following equation (1)

$$\text{Relative viscosity} = t/t0 \quad (1)$$

The polyamide (A) in the present invention has a number average molecular weight (Mn) as measured by gel permeation chromatography (GPC) preferably ranging from 10,000 to 50,000, and especially preferably from 14,000 to 30,000. When Mn is made to fall within the range of from 10,000 to 50,000, in the case of being formed into a molded article, the mechanical strength becomes stable, and an appropriate melt viscosity at which processability also becomes favorable from the standpoint of moldability is brought. Also, a degree of dispersion (weight average molecular weight/number average molecular weight=Mw/Mn) is preferably not more than 5.0, and especially preferably not more than 3.5. When the degree of dispersion is not more than 5.0, fluidity or stability of melt viscosity at the time of melting increases, and processability of melt kneading or melt molding becomes favorable. Also, toughness is favorable, and various physical properties such as resistance to water absorption, chemical resistance, and heat aging resistance become favorable.

The polyamide resin composition of the present invention contains an aromatic secondary amine compound (B) as a constituent component other than the polyamide (A). Among aromatic secondary amine compounds, those having a diphenylamine skeleton, those having a phenylnaphthylamine skeleton, and those having a dinaphthylamine skeleton are preferable. Specifically, there can be exemplified phenyl-1-naphthylamine, octylated diphenylamine, 4,4'-bis($\alpha,\alpha$-dimethylbenzyl)diphenylamine, p-(p-toluenesulfonylamino)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 2,2'-dinaphthylamine, 1,2'-dinaphthylamine, and 1,1'-dinaphthylamine; or mixtures thereof. However, it should not be construed that the invention is limited thereto. Of these, 4,4'-bis($\alpha,\alpha$-dimethylbenzyl)diphenylamine, N,N'-di-2-naphthyl-p-phenylenediamine, and N,N'-diphenyl-p-phenylenediamine are especially preferable.

A blending amount of such an aromatic secondary amine compound (B) is preferably from 0.05 to 5 parts by mass, more preferably from 0.1 to 2.0 parts by mass, and especially preferably from 0.2 to 1.0 part by mass based on 100 parts by mass of the polyamide (A). When the blending amount is from 0.05 to 5 parts by mass, a sufficient effect for heat aging resistance is obtainable, and surface defect of a molded article to be caused due to bleeding onto the surface of the molded article, lowering of surface hardness, and the like can be prevented from occurring.

The polyamide resin composition of the present invention contains an organic sulfur based compound (C) as a constituent component other than the polyamide (A). Among organic sulfur based compounds, mercaptobenzoimidazole based compounds, dithiocarbamic acid based compounds, thiourea based compounds, and organic thio acid based compounds are preferable. Specifically, there can be exemplified 2-mercaptobenzoimidazole, 2-mercaptomethylbenzimidazole, a metal salt of 2-mercaptobenzoimidazole, dilauryl-3,3'-thiodipropionate, dimyristyl-3,3'-thiodipropionate, distearyl-3,3'-thiodipropionate, pentaerythritol tetrakis(3-laurylthiopropionate), a metal salt of diethyldithiocarbamic acid, a metal salt of dibutyldithiocarbamic acid, 1,3-bis(dimethylaminopropyl)-2-thiourea, and tributylthiourea; or mixtures thereof. However, it should not be construed that the present invention is limited thereto. Of these, 2-mercaptobenzoimidazole, 2-mercaptomethylbenzimidazole, dimyristyl-3,3'-thiodipropionate, distearyl-3,3'-thiodipropionate, and pentaerythritol tetrakis(3-laurylthiopropionate) are preferable, and pentaerythritol tetrakis(3-laurylthiopropionate) is especially preferable.

A blending amount of such an organic sulfur based compound (C) is preferably from 0.05 to 5 parts by mass, more preferably from 0.1 to 2.0 parts by mass, and especially preferably from 0.2 to 1.0 part by mass based on 100 parts by mass of the polyamide (A). When the blending amount is from 0.05 to 5 parts by mass, a sufficient effect for heat aging resistance is obtainable, and surface defect of a molded article to be caused due to bleeding onto the surface of the molded article, lowering of surface hardness, and the like can be prevented from occurring.

To the polyamide resin composition of the present invention, additives such as a matting agent, a heat resistant stabilizer, a weather resistant stabilizer, an ultraviolet ray absorber, a nucleating agent, a plasticizer, a flame retarder, an antistatic agent, a coloration preventive, a gelation preventive, and the like; or inorganic fillers such as clays, e.g., a layered silicate, etc., nanofillers, and the like can also be added within the range where the effects of the present invention are not hindered. However, it should not be construed that the invention is limited thereto, and various materials can be mixed.

Also, a heat resistant resin may be blended in the polyamide resin composition of the present invention within the range where the effects of the present invention are not hindered. As examples of such a heat resistant resin, there can be exemplified polyphenylene ether, polyphenylene sulfide, polyether imide, and the like.

A production method of the polyamide resin composition of the present invention is not particularly limited, and the polyamide resin composition of the present invention can be obtained by melt kneading the polyamide (A), the aromatic secondary amine (B), the organic sulfur based compound (C), and if desired, other additives, a resin and a reinforcing material by using a known apparatus such as an extruder, a kneader, and the like. For example, there can be exemplified a method in which the polyamide (A) and materials other than an inorganic filler are fed from a proximal hopper of a twin-screw extruder, and the inorganic filler is fed from a separate feeder on the way of the extruder, thereby kneading all of the materials.

<Molded Article>

The molded article comprising the polyamide resin composition of the present invention can be produced by a known molding method such as injection molding, blow molding, extrusion molding, compression molding, stretching, vacuum molding, and the like. The polyamide resin composition of the present invention can be molded into not only a molded article as an engineering plastic but also a form such as a film, a sheet, a hollow container, a fiber, a tube, and the like, and can be suitably used for industrial materials, commercial materials, household goods, and the like.

EXAMPLES

The present invention is hereunder described in more detail by reference to the Examples and Comparative Examples, but it should not be construed that the present invention is limited to the Examples. Incidentally, in the present Examples, various measurements were carried out in the following methods.

(1) Relative Viscosity of Polyamide:

1 g of a polyamide was precisely weighed and dissolved in 100 mL of 96% sulfuric acid with stirring at from 20 to 30° C. After being completely dissolved, 5 ml of the solution was rapidly taken into a Cannon-Fenske viscometer and allowed to stand in a thermostat at 25° C. for 10 minutes, and a drop time (t) was then measured. Also, a drop time (t0) of 96% sulfuric acid itself was similarly measured. A relative viscosity was calculated from t and t0 according to the following equation (1).

$$\text{Relative viscosity} = t/t0 \quad (1)$$

(2) Tensile Strength of Film:

A tensile strength (initial) of a film was measured in conformity with JIS-K-7127. With respect to a measurement condition, a specimen width of 10 mm, a chuck-to-chuck distance of 50 mm, a tensile rate of 50 mm/min, and measurement temperature and humidity of 23° C. and 50% RH were employed, respectively; and Strograph EL, manufactured by Toyo Seiki Seisaku-sho, Ltd. was used as an apparatus.

(3) Heat Aging Resistance:

A fabricated film was heat treated at 150° C. for a prescribed time (i.e., 50 hours, 100 hours, and 150 hours) by using a hot air dryer, and thereafter, a tensile strength of the film was measured in the same manner as that in (2) and compared with the initial tensile strength.

Synthesis Example 1

In a reactor having an internal volume of 50 liters, which was equipped with a stirrer, a dephlegmeter, a condenser, a thermometer, a dropping device, a nitrogen introducing pipe, and a strand die, 8,950 g (44.25 moles) of precisely weighed sebacic acid, 12.54 g (0.073 moles) of calcium hypophosphite, and 6.45 g (0.073 moles) of sodium acetate were weighed and charged (a molar ratio of calcium hypophosphite and sodium acetate was 0.5). After thoroughly purging the inside of the reactor with nitrogen, the reactor was pressurized with nitrogen to 0.3 MPa, and the temperature was increased to 160° C. while stirring, thereby uniformly melting the sebacic acid. Subsequently, 6,026 g (44.25 moles) of paraxylylenediamine was added dropwise with stirring over 170 minutes. During this interval, an internal temperature of the reactor was continuously increased to 281° C. In the dropwise addition step, the pressure was controlled to 0.5 MPa, and formed water was removed out of the system through the dephlegmeter and the condenser. A temperature of the dephlegmeter was controlled within the range of from 145 to 147° C. After completion of the dropwise addition of paraxylylenediamine, the pressure was decreased at a rate of 0.4 MPa/h, and the pressure dropped to an atmospheric pressure over 60 minutes. During this interval, the internal temperature increased to 299° C. Thereafter, the pressure was decreased at a rate of 0.002 MPa/min, and the pressure dropped to 0.08 MPa over 20 minutes. Thereafter, the reaction was continued at 0.08 MPa until a torque of the stirrer reached a prescribed value. A reaction time at 0.08 MPa was minutes. Thereafter, the inside of the system was pressurized with nitrogen, and a polymer was taken out from the strand die and pelletized to obtain about 13 kg of Polyamide 1. A relative viscosity of Polyamide 1 was found to be 2.47.

Example 1

100 parts by mass of Polyamide 1, 0.2 part by mass of N,N'-di-2-naphthyl-p-phenylenediamine (a trade name: Nocrac White, manufactured by Ouchi Shinko Chemical Industrial Co., Ltd.), and 0.2 part by mass of pentaerythritol tetrakis (3-laurylthiopropionate) (a trade name: Sumilizer TP-D, manufactured by Sumitomo Chemical Co., Ltd.) were fed into a proximal hopper of a twin-screw extruder equipped with a T-type head (Labo-Plast Mill, manufactured by Toyo Seiki Seisaku-sho, Ltd.) at a rate of 1 kg/h. Subsequently, the resulting mixture was extruded at a cylinder temperature of from 280 to 300° C. and a T-die temperature of 300° C. and at a rotation rate of screw of 40 rpm and taken up at a cooling roll temperature of 50° C. and at a take-up rate of 2.5 m/min, thereby fabricating a film having a thickness of 70 μm. Subsequently, the film was subjected to an annealing treatment at 150° C. for one hour to obtain a film for evaluation. An evaluation result is shown in Table 1.

Example 2

A film was obtained in the same manner as that in Example 1, except that the amount of N,N'-di-2-naphthyl-p-phenylenediamine was changed to 0.4 part by mass, and the amount of pentaerythritol tetrakis(3-laurylthiopropionate) was changed to 0.4 part by mass, and then similarly evaluated. An evaluation result is shown in Table 1.

Example 3

A film was obtained in the same manner as that in Example 1, except that the N,N'-di-2-naphthyl-p-phenylenediamine was changed to 4,4'-bis(α,α-dimethylbenzyl)diphenylamine (a trade name: Nocrac CD, manufactured by Ouchi Shinko Chemical Industrial Co., Ltd.), and then similarly evaluated. An evaluation result is shown in Table 1.

Example 4

A film was obtained in the same manner as that in Example 1, except that the pentaerythritol tetrakis(3-laurylthiopropionate) was changed to dimyristyl-3,3'-thiodipropionate (a trade name: Sumilizer TPM, manufactured by Sumitomo Chemical Co., Ltd.), and then similarly evaluated. An evaluation result is shown in Table 1.

Example 5

A film was obtained in the same manner as that in Example 1, except that the pentaerythritol tetrakis(3-laurylthiopropionate) was changed to 2-mercaptobenzoimidazole (a trade name: Sumilizer MB, manufactured by Sumitomo Chemical Co., Ltd.), and then similarly evaluated. An evaluation result is shown in Table 1.

Example 6

A film was obtained in the same manner as that in Example 1, except that the amount of N,N'-di-2-naphthyl-p-phenylenediamine was changed to 0.2 part by mass, and the amount of pentaerythritol tetrakis(3-laurylthiopropionate) was changed to 3.0 parts by mass, and then similarly evaluated. An evaluation result is shown in Table 1.

Example 7

A film was obtained in the same manner as that in Example 1, except that the amount of N,N'-di-2-naphthyl-p-phenylenediamine was changed to 3.0 parts by mass, and the amount of pentaerythritol tetrakis(3-laurylthiopropionate) was changed to 0.2 part by mass, and then similarly evaluated. An evaluation result is shown in Table 1.

Comparative Example 1

A film was obtained in the same manner as that in Example 1, except that N,N'-di-2-naphthyl-p-phenylenediamine and pentaerythritol tetrakis(3-laurylthiopropionate) were not added, and then similarly evaluated. An evaluation result is shown in Table 1.

Comparative Example 2

A film was obtained in the same manner as that in Example 1, except that pentaerythritol tetrakis(3-laurylthiopropionate) was not added, and then similarly evaluated. An evaluation result is shown in Table 1.

Comparative Example 3

A film was obtained in the same manner as that in Example 1, except that N,N'-di-2-naphthyl-p-phenylenediamine was not added, and then similarly evaluated. An evaluation result is shown in Table 1.

Comparative Example 4

A film was obtained in the same manner as that in Example 1, except that the N,N'-di-2-naphthyl-p-phenylenediamine was changed to N,N'-hexane-1,6-diylbis[3-(3,5-di-tert-butyl-4-hydroxyphen ylpropionamide)] (Irganox 1098, manufactured by Ciba Japan K.K.), and then similarly evaluated. An evaluation result is shown in Table 1.

Comparative Example 5

A film was obtained in the same manner as that in Example 1, except that the pentaerythritol tetrakis(3-laurylthiopropionate) was changed to N,N'-hexane-1,6-diylbis[3-(3,5-di-tert-butyl-4-hydroxyphen ylpropionamide)], and then similarly evaluated. An evaluation result is shown in Table 1.

Comparative Example 6

A film was obtained in the same manner as that in Example 1, except that in Example 1, the pentaerythritol tetrakis(3-laurylthiopropionate) was changed to bis(2,6-di-tert-butyl-4-methylphenyl)pentaerythritol-di-phosphite (a trade name: Mark PEP-36, manufactured by Adeka Corporation), and then similarly evaluated. An evaluation result is shown in Table 1.

TABLE 1

| | Additive | | | | Tensile strength (MPa) | | | |
|---|---|---|---|---|---|---|---|---|
| | Kind | Addition amount [1] | Kind | Addition amount [1] | At the beginning | After 50 hours | After 100 hours | After 150 hours |
| Example 1 | B-1 [2] | 0.2 | C-1 [5] | 0.2 | 79 | 80 | 83 | 71 |
| Example 2 | B-1 [2] | 0.4 | C-1 [5] | 0.4 | 77 | 79 | 80 | 73 |
| Example 3 | B-2 [3] | 0.2 | C-1 [5] | 0.2 | 79 | 71 | 63 | 58 |
| Example 4 | B-1 [2] | 0.2 | C-2 [6] | 0.2 | 87 | 76 | 69 | 62 |
| Example 5 | B-1 [2] | 0.2 | C-3 [7] | 0.2 | 78 | 76 | 80 | 65 |
| Example 6 | B-3 [4] | 0.2 | C-1 [5] | 3.0 | 77 | 75 | 72 | 71 |
| Examplle 7 | B-3 [4] | 3.0 | C-1 [5] | 0.2 | 80 | 79 | 77 | 72 |
| Comparative Example 1 | — | — | — | — | 78 | 42 | 24 | 20 |
| Comparative Example 2 | B-1 [2] | 0.2 | — | — | 77 | 72 | 35 | 25 |
| Comparative Example 3 | — | — | C-1 [5] | 0.2 | 79 | 48 | 40 | 35 |
| Comparative Example 4 | D-1 [8] | 0.2 | C-1 [5] | 0.2 | 78 | 76 | 49 | 32 |
| Comparative Example 5 | B-1 [2] | 0.2 | E-1 [9] | 0.2 | 78 | 74 | 30 | 22 |
| Comparative Example 6 | B-1 [2] | 0.2 | E-2 [10] | 0.2 | 78 | 72 | 33 | 27 |

[Note]
1) The addition amount of each of the additives such as the aromatic secondary amine compound (B), the organic sulfur compound (C), and the like is on the basis of 100 parts by mass of the polyamide 1.
2) B-1: N,N'-Di-2-naphthyl-p-phenylenediamine
3) B-2: 4,4'-Bis(α,α-dimethylbenzyl)diphenylamine
4) B-3: N,N'-Di-2-naphthyl-p-phenylenediamine
5) C-1: Pentaerythritol tetrakis(3-laurylthiopropionate)
6) C-2: Dimyristyl-3,3'-thiodipropionate
7) C-3: 2-Mercaptomethylbenzimidazole
8) D-1: N,N'-Hexane-1,6-diylbis[3-(3,5-di-tert-butyl-4-hydroxyphen ylpropionamide)] (Irganox 1098, manufactured by Ciba Japan K.K.)
9) E-1: N,N'-Hexane-1,6-diylbis[3-(3,5-di-tert-butyl-4-hydroxyphen ylpropionamide)]
10) E-2: Bis(2,6-di-tert-butyl-4-methylphenyl)pentaerythritol-di-phosphite (a trade name: Mark PEP-36, manufactured by Adeka Corporation)

As is clear from Table 1, in each of the Comparative Examples, the tensile strength after the heat treatment was significantly lowered, whereas in each of the Examples, the initial tensile strength was substantially kept, so that excellent heat aging resistance is revealed.

The invention claimed is:

1. A polyamide resin composition, comprising:
   (A) a polyamide comprising (a1) a diamine unit comprising 70% by mole or more of (a1i) a paraxylylenediamine unit and (a2) a dicarboxylic acid unit comprising 70% by mole or more of (a2i) a linear aliphatic dicarboxylic acid unit comprising from 6 to 18 carbon atoms;
   (B) an aromatic secondary amine compound; and
   (C) an organic sulfur comprising compound,
   wherein the polyamide resin composition comprises from 0.05 to 5 parts by mass of the aromatic secondary amine compound (B) and from 0.05 to 5 parts by mass of the organic sulfur based compound (C) based on 100 parts by mass of the polyamide (A).

2. The composition of claim 1, wherein the linear aliphatic dicarboxylic acid (a2i) is at least one member selected from the group consisting of azelaic acid, sebacic acid, undecane diacid, and dodecane diacid.

3. The composition of claim 1, wherein the linear aliphatic dicarboxylic acid (a2i) is at least one member selected from the group consisting of sebacic acid and azelaic acid.

4. The composition of claim 1, wherein the aromatic secondary amine compound (B) is at least one selected from the group consisting of a compound having a diphenylamine skeleton, a compound having a phenylnaphthylamine skeleton, and a compound having a dinaphthylamine skeleton.

5. The composition of claim 1, wherein the aromatic secondary amine compound (B) is at least one selected from the group consisting of N,N'-di-2-naphthyl-p-phenylenediamine, N,N'-diphenyl-p-phenylenediamine, and 4,4'-bis(α,α-dimethylbenzyl)diphenylamine.

6. The composition of claim 1, wherein the organic sulfur comprising compound (C) is at least one selected from the group consisting of a mercaptobenzoimidazole comprising compound, a dithiocarbamic acid comprising compound, a thiourea comprising compound, and an organic thio acid comprising compound.

7. The composition of claim 1, wherein the organic sulfur comprising compound (C) is at least one selected from the group consisting of 2-mercaptobenzoimidazole, 2-mercaptomethylbenzimidazole, dimyristyl-3,3'-thiodipropionate, distearyl-3,3'-thiodipropionate, and pentaerythritol tetrakis (3-laurylthiopropionate).

8. A molded article, comprising the composition of claim 1.

9. The article of claim 8, which is prepared by injection molding.

10. The article of claim 8, which is prepared by extrusion molding.

11. The article of claim 8, which is prepared by compression molding.

12. The composition of claim 1, wherein the linear aliphatic dicarboxylic acid (a2i) comprises sebacic acid.

13. The composition of claim 1, wherein the linear aliphatic dicarboxylic acid (a2i) comprises azelaic acid.

14. The composition of claim 1, wherein the aromatic secondary amine compound (B) comprises N,N'-di-2-naphthyl-p-phenylenediamine.

15. The composition of claim 1, wherein the aromatic secondary amine compound (B) comprises N,N'-diphenyl-p-phenylenediamine.

16. The composition of claim 1, wherein the aromatic secondary amine compound (B) comprises 4,4'-bis(α,α-dimethylbenzyl)diphenylamine.

17. The composition of claim 2, wherein the aromatic secondary amine compound (B) is at least one selected from the group consisting of a compound having a diphenylamine skeleton, a compound having a phenylnaphthylamine skeleton, and a compound having a dinaphthylamine skeleton.

18. The composition of claim 2, wherein the organic sulfur comprising compound (C) is at least one selected from the group consisting of a mercaptobenzoimidazole comprising compound, a dithiocarbamic acid comprising compound, a thiourea comprising compound, and an organic thio acid comprising compound.

19. The composition of claim 17, wherein the organic sulfur comprising compound (C) is at least one selected from the group consisting of a mercaptobenzoimidazole comprising compound, a dithiocarbamic acid comprising compound, a thiourea comprising compound, and an organic thio acid comprising compound.

20. The composition of claim 1, wherein the organic sulfur comprising compound (C) comprises a mercaptobenzoimidazole comprising compound.

* * * * *